(12) United States Patent
Haldorsen

(10) Patent No.: US 6,956,790 B2
(45) Date of Patent: Oct. 18, 2005

(54) BOREHOLE SONIC DATA PROCESSING METHOD

(75) Inventor: Jakob B. U. Haldorsen, Norwalk, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 193 days.

(21) Appl. No.: 10/601,503

(22) Filed: Jun. 23, 2003

(65) Prior Publication Data

US 2004/0223412 A1 Nov. 11, 2004

Related U.S. Application Data

(60) Provisional application No. 60/465,318, filed on Apr. 25, 2003.

(51) Int. Cl.[7] ................................................. G01V 1/40
(52) U.S. Cl. ........................... 367/25; 367/38; 367/43; 367/50; 702/6; 702/17
(58) Field of Search ............................. 367/25, 34, 38, 367/43, 50; 702/6, 17

(56) References Cited

U.S. PATENT DOCUMENTS

| | | | | |
|---|---|---|---|---|
| 3,127,585 A | * | 3/1964 | Stark et al. ................... | 367/53 |
| 4,918,670 A | * | 4/1990 | Wang ........................... | 367/38 |
| 5,555,530 A | | 9/1996 | Meehan ........................ | 367/45 |
| 5,971,095 A | | 10/1999 | Ozbek .......................... | 181/112 |
| 6,446,008 B1 | | 9/2002 | Ozbek .......................... | 702/117 |

FOREIGN PATENT DOCUMENTS

JP          10-62555          3/1998

OTHER PUBLICATIONS

Chang, C. et al. "Localized Maps of the Subsurface". *Oilfield Review*, Spring Issue (1998).
Coates, R. T. et al. "Single Well Sonic Imaging: High–Definition Reservoir Cross–Sections from Horizontal Wells". *SPE–CIM*, Int'l Conf. Horizontal Well Tech. (2000).

Esmersoy, C. et al. "Acoustic Imaging of Reservoir Structures from a Horizontal Well: The Leading Edge". *Soc. Expl. Geophys.*, vol. 17, pp. 940–946.

Marple, S. L. Digital Spectral Analysis with Applications *Prentice–Hall Signal Processing Series* (1987).

Miller, D. et al. A New Slant on Seismic Imaging: Migration and Integral Geometry: *Geophysics*, vol. 52, pp. 943–964 (Jul. 1987).

Watanabe, S. et al. "Reflector Imaging Using Borehole Acoustic Reflection Survey". *SPWLA–J*, Paper Q (Sep. 1998).

Wiggins, R. A. et al. "Recursive Solution to the Multichannel Filtering Problem". *J. Geophys. Res.* vol. 70, pp. 1885–1891 (Apr. 1965).

Yamamoto, H. et al. "Borehole Acoustic Refection Survey Experiments in Horizontal Wells for Accurate Well Positioning". *SPE–CIM*, Int'l Conf. Horizontal Well Tech. (2000).

* cited by examiner

Primary Examiner—Ian J. Lobo
(74) Attorney, Agent, or Firm—William B. Batzer; Jody Lynn DeStefanis; Dale Gaudier

(57) ABSTRACT

A method of processing sonic wireline or logging while drilling data acquired in a borehole that includes filtering the sonic data to attenuate tool-borne and borehole-borne arrivals; migrating the filtered sonic data; and beamforming the filtered and migrated sonic data to determine a position of a reflector with respect to the borehole. The sonic data may be processed down-hole, transmitted to the surface, and used for geosteering purposes while drilling. The filter may comprise an adaptive noise-attenuating filter capable of attenuating noise arising from different borehole modes from desired signal and allowing for changes in the source signature.

11 Claims, 4 Drawing Sheets

BOREHOLE SONIC DATA PROCESSING METHOD

This application claims the benefit of U.S. Provisional Application No. 60/465,318, filed Apr. 25, 2003, incorporated herein by reference.

FIELD OF THE INVENTION

The present invention relates to methods of processing sonic data acquired in a borehole. The present invention more particularly relates to an improved method of processing sonic data acquired in a borehole in which borehole-borne arrivals are attenuated and/or positions of reflectors with respect to the borehole are determined. The sonic data may be processed down-hole using the method, transmitted to the surface, and used for geosteering purposes while drilling. The filter may comprise an adaptive noise-attenuating filter capable of attenuating borehole-borne noise and allowing for changes in the source signature.

BACKGROUND OF THE INVENTION

Surface seismic and vertical seismic profiling (VSP) methods often provide a good image of the overall geological structure of a hydrocarbon reservoir, but these methods are typically unable to describe smaller-scale reservoir features. Sonic and other well logging methods provide excellent resolution of bedding layers intersecting the borehole, but these measurements typically reflect conditions only in the immediate vicinity of the borehole. Sonic imaging was created to bridge the gap in spatial resolution between these seismic and well logging methods.

The assignee of the present application, Schlumberger, has developed a wireline sonic imaging tool (referred to as the Borehole Acoustic Reflection Survey (BARS) tool) that allows reservoir features such as reflectors and fractures to be imaged. Additional information regarding sonic imaging in general and the BARS tool in particular may be found in the following documents, each of which is incorporated herein by reference:

Japanese Patent Office laid open publication number 10-62555, published Mar. 6, 1998, entitled "Method and Apparatus for Borehole Acoustic Reflection Logging";

Watanabe, S., Fujii, K., and Mikada, H.: "Reflector imaging using Borehole Acoustic Reflection Survey," Proc., the $4^{th}$ Well Logging Symposium of Japan, SPWLA-J, Makuhari, Japan, September 1998, paper Q;

Chang, C., Hoyle, D., Coates, R., Kane, M. R., Dodds, K., Esmersoy, C. and Foreman, J. 1998. Localized maps of the subsurface, Oilfield Review, Spring Issue;

Esmersoy, C., Chang, C., Kane, M. R., Coates, R. T., Tichelaar, B. and Quint, E., 1998. Acoustic imaging of reservoir structures from a horizontal well: The Leading Edge, Soc. Expl. Geophys., 17, 940–946;

Coates, R. T., Kane, M. R., Chang, C., Esmersoy, C., Fukuhara, M., Yamamoto, H., 2000. Single well sonic imaging: High-definition reservoir cross-sections from horizontal wells, SPE-CIM Int'l Conf. Horizontal Well Technology; and Yamamoto, H., Watanabe, S., Koelman, J. M. V., Geel, J., Brie, A., Fujii, K., Coates, R., 2000. Borehole acoustic refection survey experiments in horizontal wells for accurate well positioning, SPE-CIM Int'l Conf. Horizontal Well Technology.

While significant successes in sonic imaging have been obtained, data acquired for sonic imaging purposes typically contain many types of arrivals in addition to the desired reflected arrivals, such as tool-borne noise and borehole-borne noise (direct compressional and shear headwaves and tube waves, for instance). Effectively attenuating this noise is an important step in properly processing this sonic imaging data.

Another issue important in the processing and interpretation of sonic imaging data is determining whether the reflectors are above, below, or to the side of the wellbore. Various methods of attempting to determine reflector positions are known in the art. Typically, these methods require assumptions to be made regarding the geometry of the subsurface reflectors or the geometry of the subsurface reflectors with respect to the desired borehole trajectory. A method that is capable of determining the position of the reflectors independently of these types of assumptions is clearly desirable.

Accordingly, an object of the present invention is to provide an improved method of processing sonic data acquired in a borehole in which tool-borne and borehole-borne arrivals may be attenuated and/or the azimuthal positions of reflectors with respect to the borehole may be determined.

A further object of certain embodiments of the present invention is to provide an improved method of using processed sonic data for geosteering purposes while drilling.

SUMMARY OF THE INVENTION

One aspect of this invention involves a method of processing sonic wireline or logging while drilling data acquired in a borehole that includes filtering the sonic data to attenuate borehole-borne arrivals; migrating the filtered sonic data; and beam forming the filtered and migrated sonic data to determining the position of a reflector with respect to the borehole. The sonic data may be processed down-hole, transmitted to the surface, and used for geosteering purposes while drilling. Another aspect of this invention involves an adaptive noise-attenuating filter capable of attenuating borehole-borne noise and allowing for changes in the source signature. Further features and applications of the present invention will be apparent from the figures and detailed description that follow.

DETAILED DESCRIPTION

Figure 1:
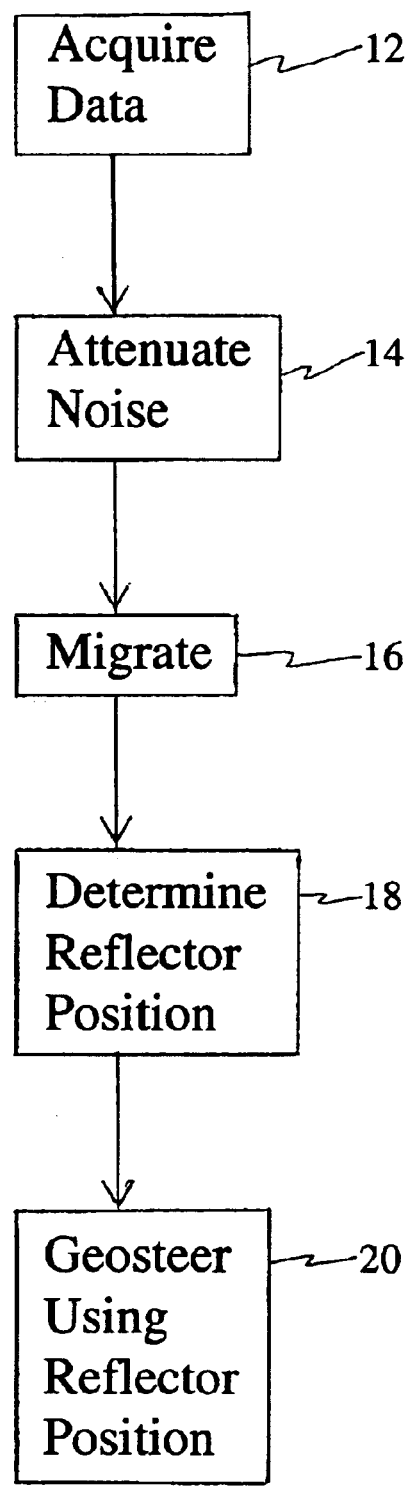
FIG. 1 is a flowchart illustrating processes associated with the inventive method.

A flowchart illustrating processes associated with embodiments of the inventive method is shown in FIG. 1. The first process illustrated in FIG. 1 is Acquire Borehole Data 12. The acquired data is then filtered in the Attenuate Noise 14 process. The filtered data is then migrated in the Migrate 16 process. The filtered and migrated data is subjected to beamforming in the Determine Reflector Position 18 process. The processed sonic data may be used while drilling in the Geosteer Using Reflector Position 20 process. Each of these steps will now be discussed in more detail below.

Acquire Data

The BARS tool has four sets of hydrophone receivers equidistantly spaced about the periphery of the tool. The four receiver banks, referred to as OR, ER, OL, and EL (arranged in clockwise fashion when viewed from the upper end of the tool), consist of 8 hydrophones which are spaced arranged along the length of the tool at one half foot intervals. This tool allows, as described below, the azimuth of a reflector to be determined by triangulating the measurements obtained by the different receiver banks because the receiver banks are spatially separated when projected onto a plane perpendicular to the central axis of the borehole. The source is separated from the strings of hydrophones by a variable distance, typically 15–35 feet.

Figure 2:
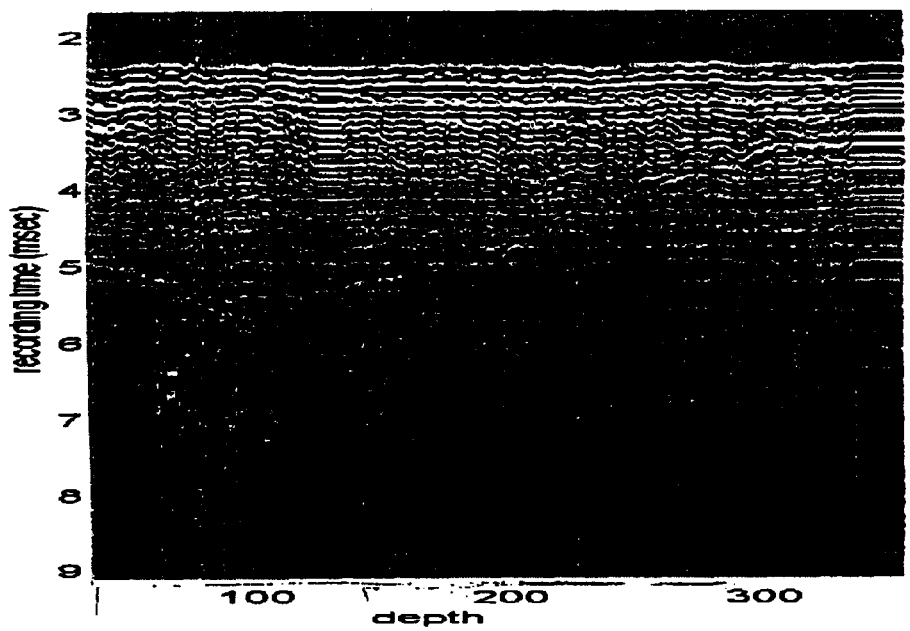
FIG. 2 displays raw sonic wireline logging data.

The data shown in FIG. 2 was collected using a minimum source/receiver offset distance of 15 feet. The source, located 15 feet below the receivers, used a 7.5-kHz truncated sine wave, emitting frequencies between 5 and 15 kHz. The tool was moved one half foot up hole between shots. Approximately 800 feet of data was acquired. Approximately 300 feet of the raw data from receiver group ER is shown in FIG. 2.

Adaptively Filter Data

To separate reflected energy from directly transmitted energy (such as tube and shear wave energy and tool-borne noise), a combined fk and adaptive-interference-canceling filter is preferably applied to the common-shot gathers for each of the four sets of receivers. This filter adaption technique can compensate for changes in the source signature in the acquired data. The adaptive 2J×2M filter w attempts to predict the present sample on any given trace from the preceding samples on the preceding traces and from the following samples on the following traces. Each of the filters, w, are different and the filter weights, w, may vary with respect to both time and spatial position of the samples being filtered. The filtered data d'$_{m,n}$ is set to the minimum unpredicted amplitude (w is the filter that minimizes $\Sigma_n |e_{m,n}|^2$, the prediction-error energy).

Using d$_{m,n}$ to mean sample m from trace n, the prediction-error, e$_{m,n}$, for trace m, sample n, is:

$$e_{m,n} = d_{m,n} - \sum_{j=m-1}^{m-J} \sum_{k=L}^{M} w_{j,k} d_{j,n-k} - \sum_{j=m+1}^{m+J} \sum_{k=L}^{M} w_{j,k} d_{j,n+k}. \quad (1)$$

The covariance matrices are Hermetian Toeplitz matrices and they may be inverted using Levinson recursion to find the filter weights w as described in Marple, S. L. 1987, Digital Spectral Analysis with Applications, Prentice-Hall Signal Processing Series (Oppenheimer, A. V., editor), New Jersey, 1987, pp. 80–87, 104–105.

An alternative to inverting the covariance matrices to find the filter weights w is to find the weights by an adaptation process. This process involves letting w slowly adapt in the direction of the steepest descent for the error energy. The filter w used to produce the data in FIG. 3 was 20 samples long by 8 traces wide (the length of the receiver arrays). The filter was allowed to change by at most 1% per sample point and it was run through the data several times to allow the filter to adapt.

Using this filter adaptation technique, it is preferable to iterate the process over the length of the traces a number of times (at least twice). When this filtering technique is applied to reduce coherent noise in a set of traces, it is important to reduce the amount of signal in the data window used for prediction. Assuming the coherent signal has been approximately aligned, the purpose of the gap of length L is to decrease the signal energy in the window used for prediction. In this example, L was set to zero.

As the filter only works on two of the four quadrants in fk-space, the signal can be protected by placing it in a quadrant that is not affected by the filter. In order to separate the direct from the reflected compressional waves, the data was shifted before applying the filter, lining up waves with a phase velocity across the array of 4/3 of 8000 ft/s, or 10,667 ft/s, effectively letting the adaptive filter remove waves that move across the array at apparent velocities lower than this. The net effect of applying this shift before the adaptive filtering is to limit the angle of incidence, rejecting energy with a larger angle of incidence. The directly transmitted wave, which propagates along the tool at an angle of incidence of 90 degrees, is effectively attenuated by this procedure.

Additional information regarding related adaptive noise-attenuating filters may be found in the following commonly-assigned U.S. Patents, each of which is incorporated herein by reference:

U.S. Pat. No. 5,555,530 entitled "Method for Improving-Signal to Noise Ratio", issued Sep. 10, 1996 to Richard J. Meehan;

U.S. Pat. No. 5,971,095 entitled "Noise Filtering Method for Seismic Data", issued Oct. 26, 1999 to Ali Ozbek; and U.S. Pat. No. 6,446,008 B1 entitled "Adaptive Seismic Noise and Interference Attenuation Method", issued Sep. 3, 2002 to Ali Ozbek.

This adaptive noise-attenuating filter also has application with respect to other measurements of propagating wave fields where there is a need to separate desired signal from high-energy, sometimes badly sampled, mostly linear noise from different borehole modes. These areas include, but are not limited to, VSP and seismic measurement-while-drilling data, sonic measurement-while-drilling data, and data acquired by borehole Ground Penetrating Radar equipment.

The adaptive noise-attenuating filter may be followed by one or more conventional fk filters, as desired.

Migrate Filtered Data

Figure 3:
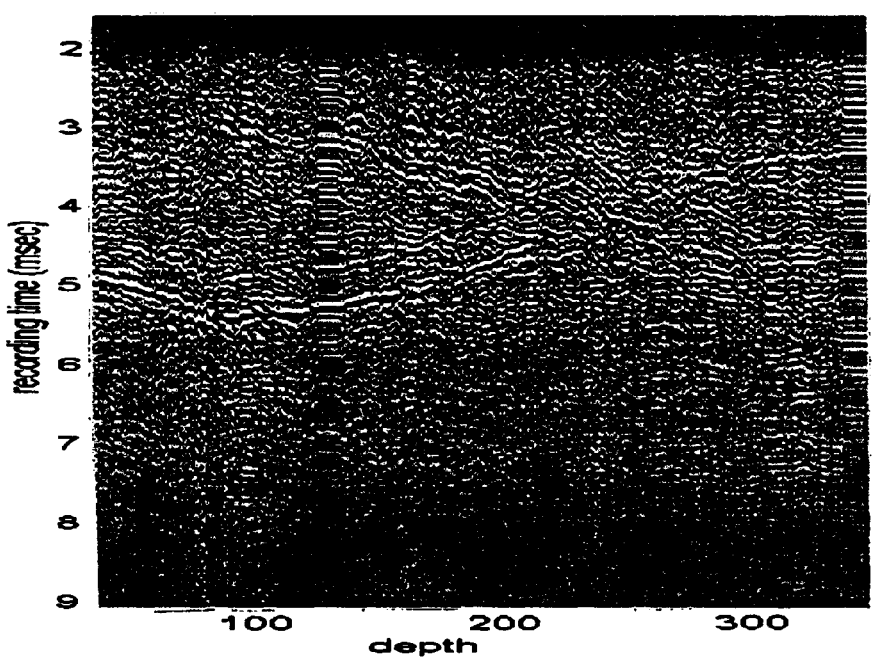
FIG. 3 displays filtered sonic wireline logging data.
Figure 4:
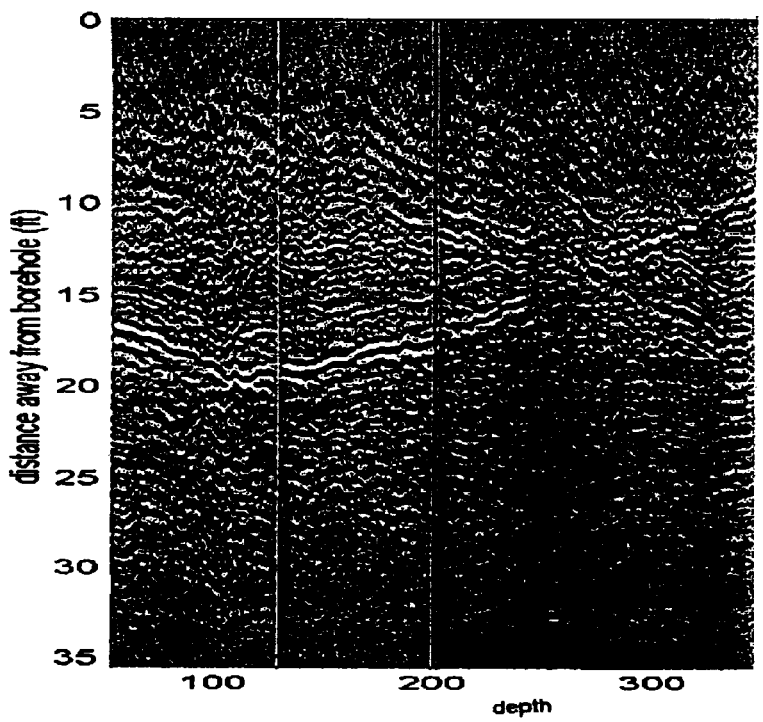
FIG. 4 displays filtered and migrated sonic wireline logging data.

The filtered data shown in FIG. 3 is suitable for wavefield migration, such as GRT migration using smoothed formation compressional velocities as measured by the sonic tool. The migration process corrects for differences between apparent positions and true positions of reflectors in the sonic data. The GRT migration process is described in detail in "A new slant on seismic imaging: Migration and integral geometry", D. Miller, et al., Geophysics, Vol. 52, No. 7 (July 1987), p. 943–964, incorporated herein by reference.

Determine Reflector Positions

The azimuth separation technique is based on the fact that the images obtained from measurements made by each of the four sets of receivers OR, EL, OL, and ER essentially measures distances perpendicular to the borehole to any given reflector from four different vantage points, making it possible to perform a formal triangulation to find the positions of the reflectors.

Using D to denote the side in the square cross section of the tool (i.e. the distance between adjacent receiver banks), $\varphi$ measuring the azimuth around the borehole relative to OR, and $R_b$ the relative bearing of the tool (the orientation of OR relative to the vertical, determined, for instance, using an inclinometer device installed within the tool, and median-filtered if the measurements are too noisy), the triangulation is done by applying the spatial shifts $\Delta_{OR}$, $\Delta_{EL}$, $\Delta_{OL}$, and $\Delta_{ER}$ to the image obtained from the receiver sets OR, EL, OL, and ER, respectively:

$$\Delta_{OR} = -\frac{D}{2}\sqrt{2}\cos(\varphi - R_b) \quad (2)$$

$$\Delta_{EL} = -\frac{D}{2}\sqrt{2}\sin(\varphi - R_b)$$

$$\Delta_{OL} = \frac{D}{2}\sqrt{2}\cos(\varphi - R_b)$$

$$\Delta_{ER} = \frac{D}{2}\sqrt{2}\sin(\varphi - R_b)$$

Separation based on these angularly dependant shifts becomes less effective for components of the images with wavelength longer than twice the maximum spatial separation between the lines defining the reference lines of the images, and becomes essentially ineffective for wavelength more than four times this maximum separation. With the BARS tool configuration, the effective maximum separation between the images is the diameter of the tool, approximately three and five eighths inches.

The logged section of the borehole shown in FIG. 2 was practically horizontal. The measured Relative Bearing ($R_b$) of the tool varied from about 80° at the deepest end of the logged section to about 150° at the shallowest part.

While a conventional shift-and-sum beam former may be used to determine the position of a reflector with respect to the borehole, an adaptive beam-forming filter is preferred because it estimates and attenuates "noise" (energy moving across the array with a residual moveout) before stacking. This allows better isolation of signal reflectors to be achieved. The adaptive beam-forming filter can be defined as:

$$I_j(r, \varphi) = \frac{1}{N_r}\min_w \sum_{n=1}^{N_r}\left(I_{j,n}(r_n + \Delta_n(\varphi)) + \sum_{l=-L}^{+L} w_{l,n}I_{j+l,n}(r_n + \Delta_n(\varphi))\right), \quad (3)$$

where $I_{j,n}$ is sample j of image trace $I_n$ from receiver array n of the $N_r$ (=4) arrays of receivers {OR, EL, OL, ER}. The radial distance to a reflector in image $I_n$ is denoted by $r_n$. The symbols $\Delta_n$ refer to the spatial shifts defined by Equation (2). The filter w, of length 2L+1 and width 4, acts on $I_n$. The filter w is constrained to have zero mean across the array of receivers by subtracting $(\Sigma_n w_{j,n})/N_r$ from each element $w_{j,n}$ of w. The filter is found through a similar adaptation process as was used for the adaptive interference-canceling filter in Equation (1).

For the adaptive beam former, a filter 31 samples long by 4 traces wide (the four sets of receivers) was used. The filter was allowed to change by at most 1% per sample point. The filter was allowed to adapt by running several times through the data.

Figure 5:
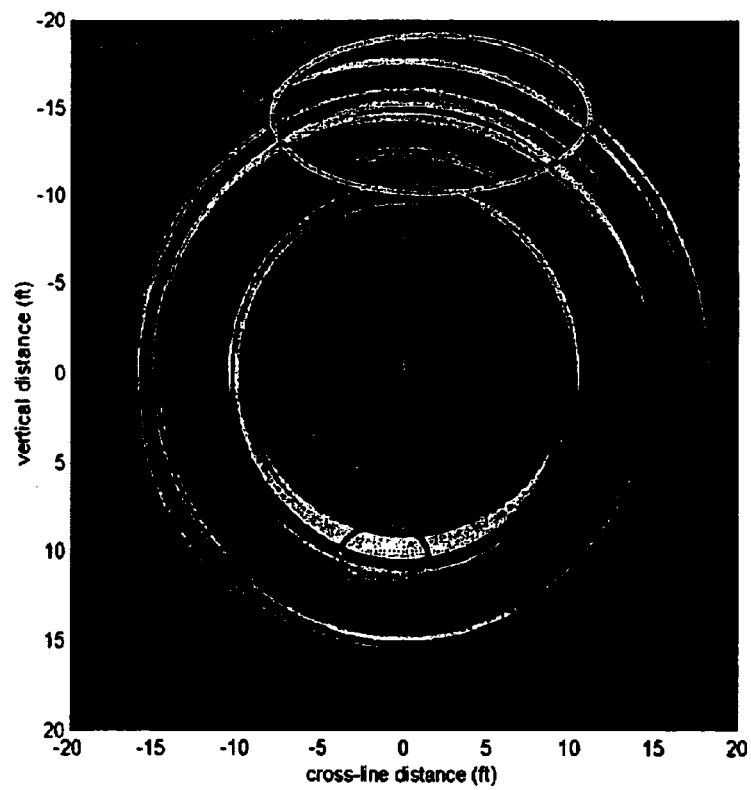
FIG. 5 displays an image of reflector amplitude as a function of azimuth.
Figure 6:
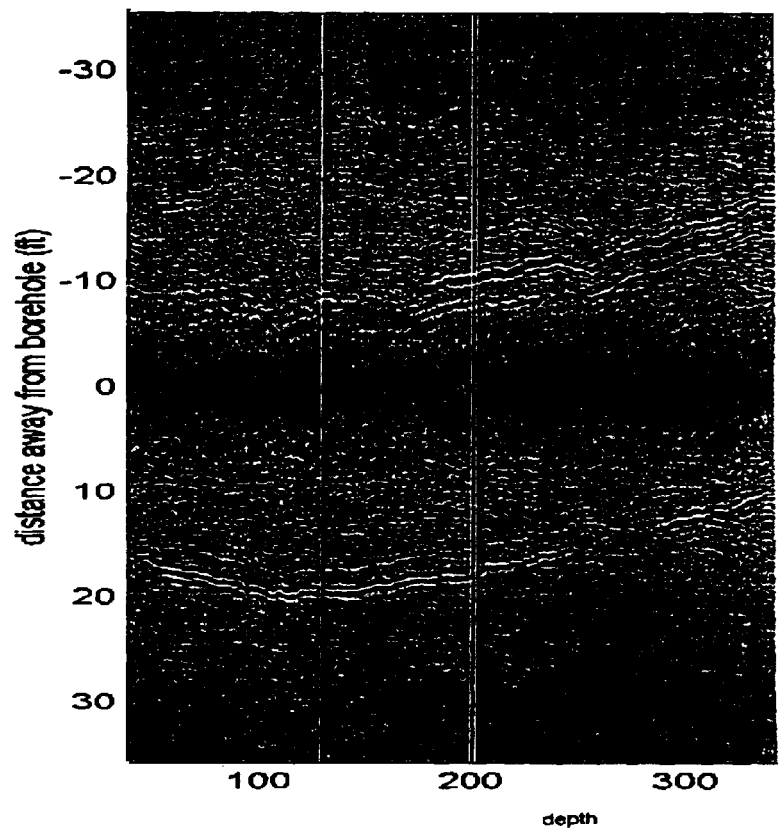
FIG. 6 displays azimuthally separated images of sonic reflectors above and below the borehole.

FIG. 5 shows the results of an azimuthal analysis of reflections at a particular position in the well using the adaptive beam former in Equation (3). The good radial and the somewhat poor azimuthal resolution give rise to a certain degree of smearing of the image. This display shows strong reflectors above the borehole centered at an azimuth of −10° and a reflector below at around 170°. Other types of displays that show energy versus incidence angle are possible, such as a display showing the received energy with the angle of incidence on one axis and the distance away from the borehole on the other axis. In FIG. 6, images separated at these two azimuths are shown along the entire displayed length of the well. The beam-formed images are plotted with the distance r going away from the well, with the well indicated by the zero distance line. While there are slight residuals or "ghosts" remaining of the reflectors on the other side of the borehole, the separation of energy associated with reflectors above and below the borehole appears to be almost perfect.

In FIG. 6, the two weak reflectors above the borehole appear to be nearly parallel to the strong reflector below the borehole, the distance between them gradually increasing at deeper relative depths. To provide adequate reflector directional discrimination using the BARS tool (where the separation between receiver banks is approximately two inches), the use of short offsets (approximately 15 feet) and a high-frequency source (approximately 7.5 kHz) is preferred.

Use Data for Geosteering

It is also possible to process the sonic data downhole and transmit essential information from the azimuthal images to the surface. For instance, the normalized image trace from FIG. 6 can be re-sampled to three bits or even one bit and transmitted to the surface. Simulations have confirmed that the three reflectors shown in FIG. 6 would be clearly visible using either type of compression technique. The images could be further compressed using standard image compression algorithms before they are transmitted to the surface for the use in geosteering.

Figure 7:
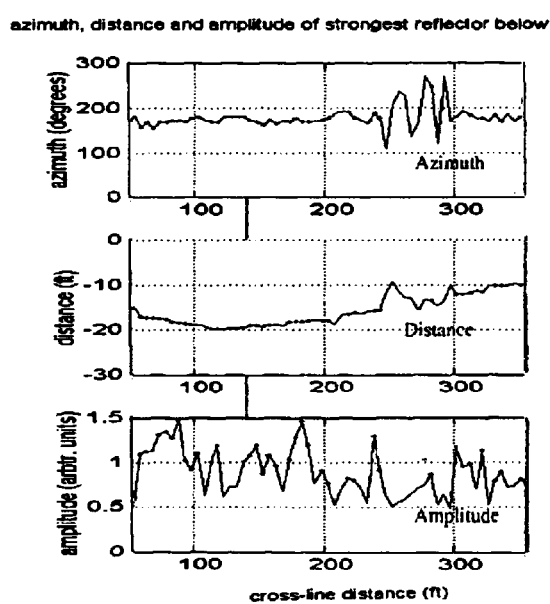
FIG. 7 displays the azimuth, distance, and amplitude of the strongest reflector located below the borehole, extracted from the data shown in FIG. 6.

FIG. 7 displays an even more compressed set of information from the image shown in FIG. 6. In FIG. 7, the azimuth, distance, and amplitude for the strongest reflector below the well for each image trace is displayed. Logs generated in this way can easily be transmitted to the surface on the mud-pulse telemetry.

The parameters of the processing of these data are determined from the geometry of the tool and acquisition, in addition to measurements of the compressional velocity of the formation. This information can be made available to the tool, and with sufficient down-hole memory and processor capacity, this processing scheme can be implemented downhole and compressed, processed images can be transmitted on a conventional measurement-while-drilling telemetry system.

While the invention has been described herein with reference to certain examples and embodiments, it will be evident that various modifications and changes may be made to the embodiments described above without departing from the scope of the invention as set forth below.

I claim:

1. A method of processing sonic wireline or logging while drilling data acquired in a borehole comprising:
    a) filtering the sonic data to attenuate borehole-borne arrivals;
    b) migrating the filtered sonic data; and
    c) beamforming the filtered and migrated sonic data to determine the position of a reflector with respect to the borehole.

2. The method of claim 1, wherein said filtering comprises adaptively filtering the sonic data.

3. The method of claim 1, wherein said filtering comprises applying a filter that attenuates noise in only two of four quadrants of fk-space.

4. The method of claim 3, wherein said sonic data is shifted before said filter is applied to place desired signal within said sonic data into a quadrant that is not affected by said filter.

5. The method of claim 1, wherein said migrating comprises generalized radon transform migrating the filtered sonic data.

6. The method of claim 1, wherein said beam-forming comprises applying an adaptive beam-forming filter.

7. The method of claim 1, further comprising displaying the position of the sonic reflector with respect to the borehole.

8. The method of claim 1, further comprising determining an azimuth and distance to said reflector downhole and transmitting said azimuth and distance to the surface.

9. The method of claim 8, further comprising using said azimuth and distance to geosteer drilling of said borehole.

10. A method of processing sonic data acquired in a borehole by a tool having a plurality of receivers positioned such that they are spatially separated when their positions are projected onto a plane perpendicular to the central axis of the borehole comprising:
    a) processing the sonic data to attenuate noise and to correct for a difference between an apparent position and a true position of a seismic reflector; and
    b) determining a position of a sonic reflector with respect to the borehole by triangulating said processed sonic data obtained from different receivers of the borehole tool.

11. The method of claim 10, further comprising displaying the position of the sonic reflector with respect to the borehole.

* * * * *